UNITED STATES PATENT OFFICE.

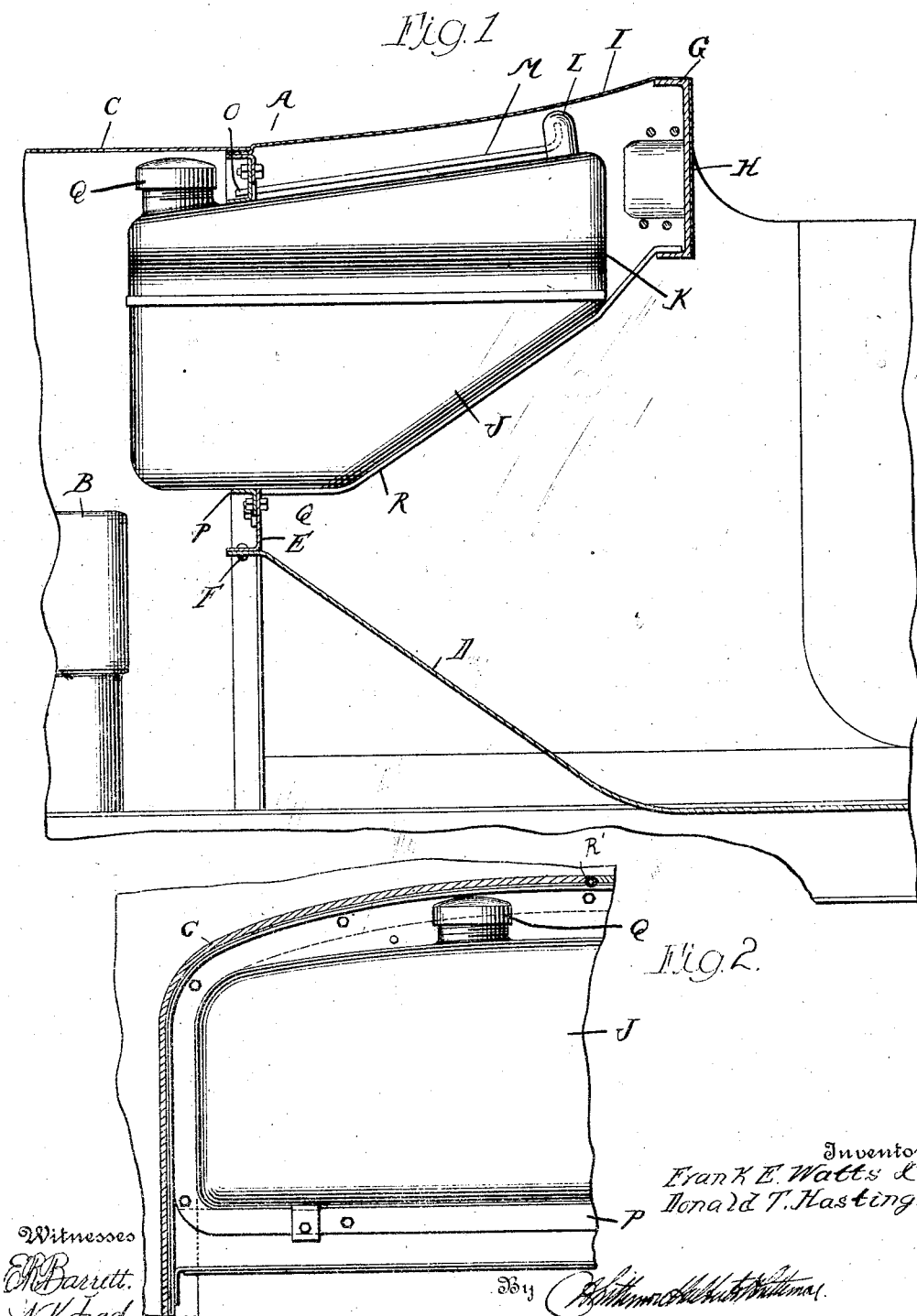

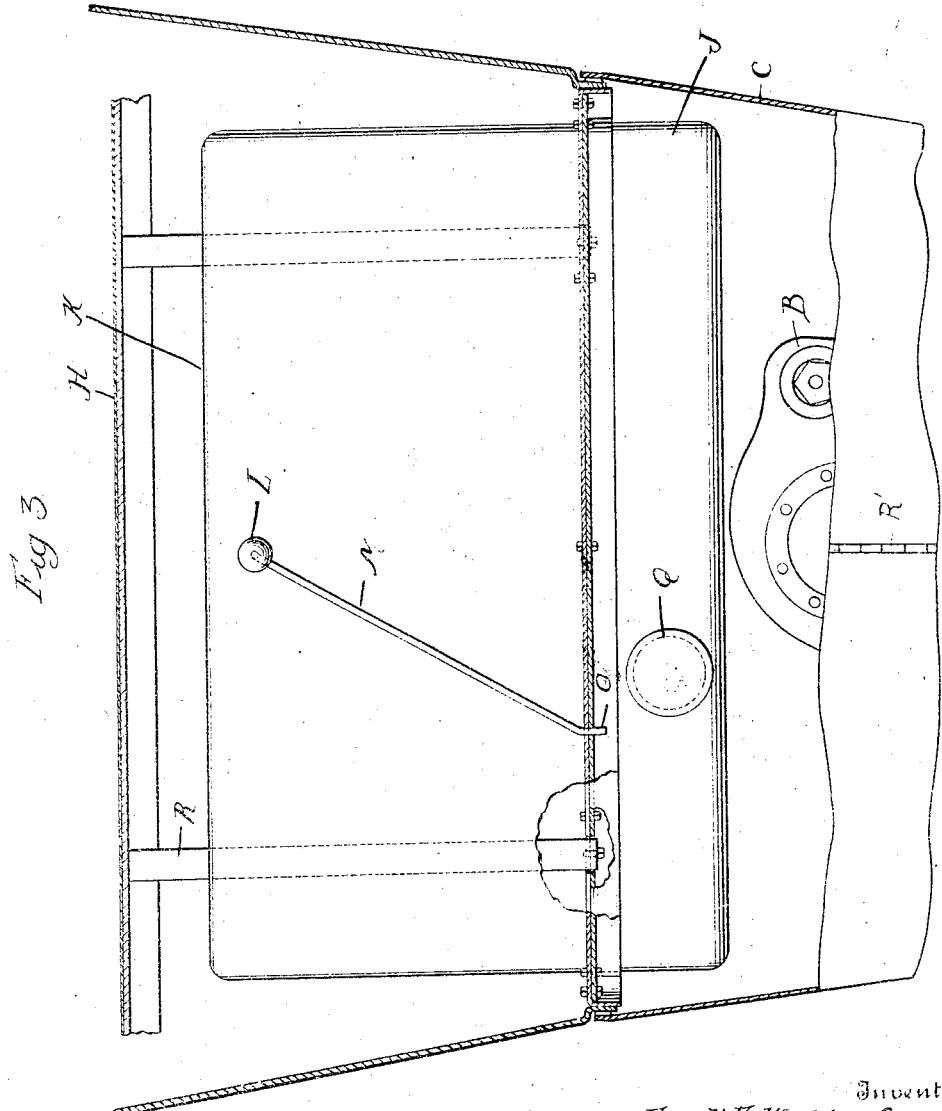

FRANK E. WATTS AND DONALD T. HASTINGS, OF DETROIT, MICHIGAN, ASSIGNORS TO HUPP MOTOR CAR COMPANY, OF DETROIT, MICHIGAN, A CORPORATION OF MICHIGAN.

MOTOR-VEHICLE.

1,158,602.   Specification of Letters Patent.   Patented Nov. 2, 1915.

Application filed January 4, 1915. Serial No. 383.

*To all whom it may concern:*

Be it known that we, FRANK E. WATTS and DONALD T. HASTINGS, citizens of the United States of America, residing at Detroit, in the county of Wayne and State of Michigan, have invented certain new and useful Improvements in Motor-Vehicles, of which the following is a specification, reference being had therein to the accompanying drawings.

The invention relates to motor vehicles and resides in the arrangement of a tank for gasolene or other fuel in relation to the vehicle; in the construction of the tank, and further, in certain details of construction as will more fully hereinafter appear.

In the drawings,—Figure 1 is a sectional view of a portion of a motor vehicle having the improvement applied thereto; Fig. 2 is a fragmentary sectional elevation looking to the front of the tank; and Fig. 3 is a sectional plan view.

A designates the cowl dash of a motor vehicle, B the engine and C the bonnet inclosing the engine.

D is the usual inclined foot-board. As shown the cowl dash A has a forward partition E, the bottom of which is connected at F to the front edge of the foot-board D, and this dash is also provided with a rear partition G, herein shown as forming a mounting for the instrument board H.

I is the hood of the cowl dash extending between the partitions E and G.

In certain constructions now in general use, the tank for gasolene or other fuel has been positioned within the cowl dash, but in such constructions the tank has been restricted in size so as to be positioned entirely within the cowl dash. Such an arrangement does not give the desired capacity for the fuel tank. We have, therefore, devised a structure which will allow the use of a cowl dash tank and still permit the latter to have sufficient capacity.

As shown, J is the fuel tank having a portion arranged within the cowl dash and having another portion projecting within the engine chamber and inclosed by the bonnet C. The portion of the tank within the cowl dash is arranged adjacent the top of the latter and is of a size to substantially fill all the available space within the cowl dash. Thus, the tank is of a width to extend from side to side of the dash, while the rear end K of the tank is positioned in very close proximity to the partition G, sufficient space being left to allow of the instrument boards and the wires leading therefrom being arranged in rear of the partition G. The portion of the tank beneath the bonnet extends in very close proximity to the engine, as will be readily noted upon reference to Fig. 1. As it is desirable to provide a vent chamber for the tank and to have this chamber extend above the level of the liquid in the tank when the latter is completely filled, the top of the tank inclines upwardly from the front end thereof and the vent chamber L is arranged adjacent the rear end of the tank. The inclination of the top of the tank is such as to provide an air chamber in the top of the tank at the rear thereof even when the tank is full and this chamber is of sufficient size and is so positioned in relation to the tank as to prevent liquid discharging from the vent chamber even when the motor vehicle is going up a very steep incline. Preferably, the arrangement is such as to allow the gases from the vent chamber to be discharged without the cowl dash. In the structure illustrated this is accomplished by providing a conduit M having one end thereof arranged within the vent chamber L while the opposite end O extends forwardly of the partition E. This overcomes any objection to the discharging of gases into the forward inclosure, which would be obnoxious to the occupants of the driver's seat.

Welded or otherwise suitably secured to the tank is an angle iron P that extends completely around the tank and is secured by means of bolts Q to the partition E. The joint between the member P and the partition is such as to be very tight, so as to prevent gases from the engine chamber entering the forward inclosure.

The portion of the tank arranged within the cowl dash is supported by means of spaced straps R extending between the partitions E and G and engaging the bottom of the tank. The latter as shown in Fig. 1, has the rear portion of the bottom inclining upwardly so as to provide the desired space over the foot-board D.

It is found very desirable to have the filler cap Q of the tank arranged within the bonnet, since this allows an unbroken surface between the bonnet and the rear portion of the cowl dash. In order to provide ready access to the filler cap, preferably the latter is arranged to one side of the longitudinal hinge R' of the bonnet, which in the present structure is positioned centrally of the bonnet.

While the forward edge of the tank is arranged in close proximity to the engine B, the arrangement of parts is such as to allow the tank to be readily removed from the cowl dash. Thus, by disconnecting the member P from the partition E the tank may be drawn forwardly through the partition E, since the rear portion of the tank is of lesser depth than the portion of the tank arranged within the engine chamber.

In order to permit the removal of the engine cylinder without dismounting the tank, the front end of the tank is spaced a slight distance from the rear face of the engine casing, as shown in Figs. 1 and 3.

We have shown and described a very desirable embodiment of the invention, but we do not desire to limit the protection to the particular structure illustrated.

What we claim as our invention is,—

1. In a motor vehicle, the combination of a body, a fuel tank thereon, the top of said tank having an upwardly inclined portion forming an air chamber, and a filler cap upon the top at its lowest level, a vent chamber communicating therewith and a discharge pipe communicating with said vent chamber and extending above said tank.

2. In a motor vehicle, the combination of a body, fuel tank rigidly mounted thereon having the top inclining upwardly toward the rear thereof, forming an air chamber, and a vent chamber communicating therewith.

3. In a motor vehicle, the combination of a body having a cowl dash, an engine bonnet extending forwardly from the front end of the cowl dash, a fuel tank having a portion arranged in the cowl dash and having another portion extending beyond the dash and positioned beneath the bonnet, and a filler cap upon the last-mentioned portion of the tank inclosed by the bonnet.

4. In a motor vehicle, the combination of a body having a cowl dash, an engine bonnet extending forwardly from the front end of the cowl dash, said bonnet being provided with a longitudinal hinge, a fuel tank having a portion arranged in the cowl dash and having another portion extending beyond the dash positioned beneath the bonnet, and a filler cap for the tank inclosed by the bonnet and arranged at one side of said longitudinal hinge.

5. In a motor vehicle, the combination of a body having a cowl dash, an engine bonnet extending forwardly from the front end of the cowl dash, said bonnet having a longitudinal central hinge, a fuel tank having a portion arranged in the cowl dash and having another portion extending beyond the dash positioned beneath the bonnet, and a filler cap for the tank inclosed by the bonnet and arranged at one side of said longitudinal hinge.

6. In a motor vehicle, the combination of a body having a cowl dash, an engine bonnet extending forwardly of the front end of the cowl dash, a fuel tank having a portion arranged within the cowl dash and having another portion extending beyond the dash and arranged beneath the bonnet, a vent chamber for said tank arranged within the dash, and a gas discharge connection for said chamber arranged to discharge without the cowl dash.

7. In a motor vehicle, the combination of a body having a cowl dash, an engine bonnet extending forwardly of the front end of the cowl dash, a fuel tank having a portion arranged within the cowl dash and having another portion extending beyond the dash and arranged beneath the bonnet, a vent chamber, and a discharge connection for said chamber opening into the bonnet.

8. In a motor vehicle, the combination of a body having a cowl dash, an engine bonnet extending forwardly of the front end of the cowl dash, a fuel tank having a portion arranged within the cowl dash and having another portion extending beyond the dash and arranged beneath the bonnet, a vent chamber for said tank positioned within said dash, a conduit leading from said chamber and arranged to discharge without said dash.

9. In a motor vehicle, the combination of a body having a cowl dash, an engine bonnet extending forwardly of the front end of the cowl dash, a fuel tank having a portion arranged within the cowl dash and having another portion extending beyond the dash and arranged beneath the bonnet, a vent chamber for the tank positioned beneath the cowl dash and arranged adjacent the rear end of the tank, and a conduit leading from said chamber and having its discharge end positioned beneath the bonnet.

10. In a motor vehicle, the combination of a body having a cowl dash, an engine bonnet extending forward from the front end of said dash, a fuel tank having a portion arranged beneath the cowl dash and another portion projecting forwardly of the front end of the cowl dash and inclosed by the bonnet, and means for detachably securing the tank in place, permitting the removal thereof through the front end of the cowl dash.

11. The combination with an engine chamber and a bonnet inclosing the same, of a cowl dash including a forward partition and a rear partition spaced therefrom, of a tank extending through the front partition having a portion arranged intermediate said partitions and another portion arranged beneath the bonnet, and means for detachably securing said tank to said forward partition.

12. The combination with an engine chamber and a bonnet inclosing the same, of a cowl dash including a forward partition and a rear partition spaced therefrom, a tank extending through said forward partition having a portion positioned intermediate said partitions and of a size to substantially fill the available space between said partitions, said tank having another portion projecting within the engine chamber and inclosed by the bonnet, means for detachably connecting said tank to said forward partition, and supporting means for the tank engaging the same and extending between the said partitions.

13. The combination with an engine chamber and a bonnet inclosing the same, of a cowl dash including a forward partition and a rear partition spaced therefrom, a tank extending through said forward partition having a portion positioned intermediate said partitions and of a size to substantially fill the available space between said partitions, said tank having another portion projecting within the engine chamber and inclosed by the bonnet, means for detachably connecting said tank to said forward partition, and a plurality of spaced straps extending between said partitions and forming a supporting means for the tank.

14. The combination with an engine chamber and a bonnet inclosing the same, of a cowl dash including a forward partition and a rear partition spaced therefrom, and a tank extending through the front partition having a portion arranged beneath the bonnet.

In testimony whereof we affix our signatures in presence of two witnesses.

FRANK E. WATTS.
DONALD T. HASTINGS.

Witnesses:
W. E. BLANCHARD,
GRANVILLE C. ALDRICH.